US008095119B2

(12) United States Patent
Sabotta et al.

(10) Patent No.: US 8,095,119 B2
(45) Date of Patent: Jan. 10, 2012

(54) IN-CALL CONTACT INFORMATION DISPLAY

(75) Inventors: Kenneth Q. Sabotta, Seattle, WA (US);
Paula Guntaur, Seattle, WA (US);
David T. Pan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 12/476,870

(22) Filed: Jun. 2, 2009

(65) Prior Publication Data
US 2010/0304729 A1 Dec. 2, 2010

(51) Int. Cl.
H04M 3/42 (2006.01)
(52) U.S. Cl. ...................... 455/415; 455/412.1; 455/566; 455/567; 709/204
(58) Field of Classification Search ............... 455/412.1, 455/412.2, 414.1, 414.2, 415, 416; 709/204–207
See application file for complete search history.

(56) References Cited

U.S. PATENT DOCUMENTS

| 6,909,910 | B2 | 6/2005 | Pappalardo et al. |
| 7,046,994 | B1 | 5/2006 | Padawer et al. |
| 7,295,852 | B1 | 11/2007 | Davis et al. |
| 7,313,617 | B2 | 12/2007 | Malik et al. |
| 2002/0077158 | A1 | 6/2002 | Scott |
| 2003/0073430 | A1 | 4/2003 | Robertson et al. |
| 2004/0001479 | A1* | 1/2004 | Pounds et al. ............... 370/352 |
| 2004/0103152 | A1 | 5/2004 | Ludwig et al. |
| 2008/0125180 | A1 | 5/2008 | Hoffman et al. |
| 2010/0015976 | A1* | 1/2010 | Issa et al. ................. 455/435.1 |
| 2010/0069058 | A1* | 3/2010 | Rothschild ................ 455/422.1 |
| 2010/0180001 | A1* | 7/2010 | Hardt ........................... 709/207 |

FOREIGN PATENT DOCUMENTS
KR 1020060127986 A 12/2006

OTHER PUBLICATIONS

"Contact Picture Display during Phone Call", Retrieved at <<http://discussions.apple.com/thread.jspa?threadID=1985002&tstart=0>>, Apr. 22, 2009, p. 1.
"Best Full Screen Caller for S60 3rd Edition", Retrieved at <<http://www.clickapps.com/moreinfo.htm?pid=17587>>, May 6, 2009, pp. 1-3.
"Best Full Screen Caller for Series 90 1.0", Retrieved at <<http://en.handybyte.com/cat/system-utilities/communications/best-full-screen-caller-for-series-90/>>, May 6, 2009, pp. 1-3.
"International Search Report", Mailed Date: Dec. 21, 2010, Application No. PCT/US2010/036939, Filed Date: Jun. 1, 2010, pp. 10.

* cited by examiner

Primary Examiner — Vladimir Magloire

(57) ABSTRACT

Call control information regarding a phone call that a user of a mobile communications device is currently engaged in with an individual is displayed on a screen. A request to display in-call contact information is received, and in response to the request the in-call contact information regarding the individual is displayed. This request can be a single user input, and the in-call contact information can include information obtained by the mobile communications device from a social networking service.

16 Claims, 7 Drawing Sheets

IN-CALL CONTACT INFORMATION DISPLAY

BACKGROUND

Mobile communications devices, such as wireless phones, have become increasingly commonplace. However, the form factor employed by conventional mobile communications devices is typically limited to promote mobility of the mobile communications device. For example, the mobile communications device may have a relatively limited amount of display area when compared to a conventional desktop computer. Although mobile communications devices may store a large amount of information, the limited amount of display area can make it difficult and cumbersome for users to access the data. This can lead to frustrating user experiences when using the mobile communications devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, call control information regarding a phone call that a user of a mobile communications device is currently engaged in with an individual is displayed on a screen. A single user input requesting display of in-call contact information is received, and in response to the single user input this in-call contact information regarding the individual is displayed.

In accordance with one or more aspects, a request to display in-call contact information regarding an individual that is currently engaged in a phone call with a mobile communications device is received. In response to the request, the in-call contact information is obtained. This in-call contact information is displayed by the mobile communications device, and includes information obtained by the mobile communications device from a social networking service.

BRIEF DESCRIPTION OF THE DRAWINGS

The same numbers are used throughout the drawings to reference like features.

DETAILED DESCRIPTION

In-call contact information display is discussed herein. A user of a mobile communications device can use the device to participate in phone calls with one or more other individuals using other devices. During such phone calls, a contact information display panel can be displayed to the user. The contact information display panel can be easily accessed by the user, such as in response to a single user input or action. The contact information display panel displays various information regarding the other individual that is part of the phone call. This information can include various data obtained regarding the other individual from a social networking service.

Figure 1:
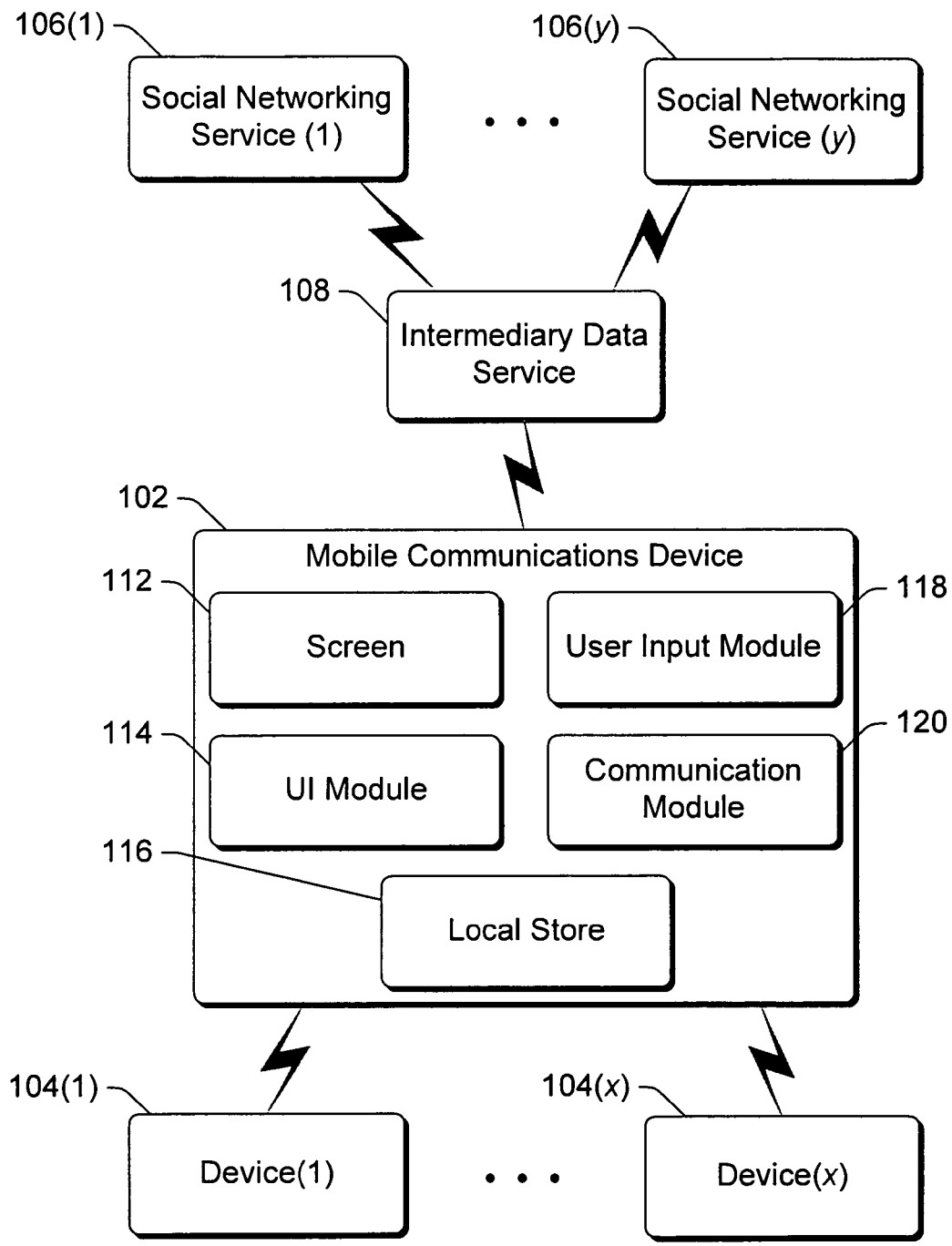
FIG. 1 illustrates an example system implementing the in-call contact information display in accordance with one or more embodiments.

FIG. 1 illustrates an example system 100 implementing the in-call contact information display in accordance with one or more embodiments. System 100 includes a mobile communications device 102 that can communicate with one or more (x) other devices 104(1), . . . , 104(x), and with one or more (y) social networking services 106(1), . . . , 106(y). A mobile communications device refers to a communications device capable of sending and receiving communications, such as phone calls, text messages, messages including other content types, and so forth. Mobile communications device 102 can be a variety of different types of devices, such as a cellular phone, a satellite phone, other types of wireless phones, a handheld computer, a personal digital assistant (PDA), an audio and/or video playback device, a portable game device, a dedicated messaging device, a netbook, and so forth. It is to be appreciated that mobile communications device 102 can include functionality in addition to being able to send and receive communications calls, such as calendar functionality, audio and/or video playback functionality, and so forth.

In one or more embodiments, mobile communications device 102 is a wireless phone. Such a wireless phone can be implemented using a variety of different form factors, such as a "brick" configuration, a "clamshell" configuration, a "slide" configuration, and so forth.

Devices 104 can be, but need not be, mobile communications devices. Devices 104 can be the same type or alternatively different types of devices as mobile communications device 102.

Mobile communications device 102 includes a screen 112, a user interface (UI) module 114, a local store 116, a user input module 118, and a communication module 120. Each of modules 114, 118, and 120 can be implemented in software, firmware, hardware, or combinations thereof. When implemented in software or firmware, a module includes one or more instructions that are executed by one or more processors or controllers of mobile communications device 102.

Screen 112 is a display component of mobile communications device 102. Screen 112 can be implemented in a variety of different manners, such as using liquid crystal display (LCD) technology, plasma screen technology, image projection technology, and so forth. Alternatively, rather than including screen 112, mobile communications device 102 can generate one or more signals that are output to other display devices which include screen 112.

Communication module 120 manages receiving of communications from and sending of communications to devices 104 and social networking services 106. Mobile communications device 102 can communicate with devices 104 using a variety of different technologies and protocols, such as cellular, satellite, and/or other technologies or protocols. The technologies or protocols can include wireless and/or wired technologies and protocols.

Communication module 120 supports a variety of different types of communications with devices 104. One type of communication supported by communication module 120 is a voice call. This can include voice calls that are initiated by mobile communications device 102 (e.g., outgoing calls), as well as voice calls that are initiated by another device 104 (e.g., incoming calls). Additionally, communication module 120 can typically support multiple voice calls concurrently (e.g., three-way calling, multi-party conferencing, call waiting or placing a call on hold, and so forth).

Another type of communication supported by communication module 120 is a message, which refers to text messages or messages with other types of media such as images, video, audio, combinations of types of media, and so forth. In one or more embodiments, messages comply with the Short Message Service (SMS) communication protocol. In one or more other embodiments, messages comply with the Multimedia Messaging Service (MMS) communication protocol. It is to be appreciated that SMS and MMS are only example protocols, and that other communication protocols can alternatively be used. Various other types of communications can also be supported by communication module 120, such as mobile instant messaging, email, and so forth.

Communication module 120 can communicate with social networking services 106 using a variety of different networks, including the Internet, a local area network (LAN), a public telephone network, an intranet, a cellular or other wireless phone network, other public and/or proprietary networks, combinations thereof, and so forth. Communication module 120 obtains data (also referred to herein as information) regarding various individuals or other entities using social networking services 106, and makes that data available for display on screen 112. It is to be appreciated that an individual can be an agent of or otherwise represent an entity as well, such as an individual representing a business, service, other group, and so forth. Accordingly, the data can be data regarding the particular individual and/or an entity that the particular individual represents. The particular individuals or entities for which data is obtained is based at least in part on individuals with which mobile communications device 102 communicates using voice calls as discussed in more detail below.

In the example system 100, communication module 120 obtains data from social networking services 106 via an intermediary data service 108. Communication module 120 provides an indication to intermediary data service 108 of one or more individuals or other entities for which data is desired. These individuals or other entities can be, for example, individuals in a local address book of device 102 (e.g., stored in local store 116). A user can maintain information regarding individuals as well as other entities (e.g., businesses, services, and other groups) in his or her local address book. Intermediary data service 108 in turn obtains data for the one or more individuals or other entities from one or more social networking services 106 and returns the obtained data to communication module 120. In one or more embodiments, intermediary data service 108 maintains a cache of data obtained from social networking services 106, and in response to a request for data from communication module 120 can return the data from the cache rather than accessing social networking services 106 at the time of the request. Intermediary data service 108 can also optionally communicate with multiple different social networking services 106.

Communication module 120 can obtain data from intermediary data service 108 in different manners, such as by using a polling technique or a notification technique. Using a polling technique, communication module 120 sends requests for data (e.g., any data that has changed) for the one or more individuals or entities to intermediary data service 108 at regular or irregular intervals. Using a notification technique, communication module 120 registers with intermediary data service 108 to receive notifications of data changes, and service 108 sends such notifications to communication module 120 of such data changes. Similarly, intermediary data service 108 can obtain data from social networking services 106 in different manners, such as by using a polling technique or a notification technique.

Alternatively, communication module 120 can communicate with one or more of social networking services 106 independent of intermediary data service 108. Communication module 120 can obtain data from social networking services 106 in different manners, such as by using a polling technique or a notification technique, analogous to the discussion above regarding obtaining data from intermediary data service 108. The discussions herein referring to obtaining data from social networking services 106 include embodiments in which the data is obtained from services 106 via intermediary data service 108, as well as embodiments in which the data is obtained from services 106 independently of intermediary data service 108.

Local store 116 is one or more computer storage media. Local store 116 can include volatile media (such as random access memory (RAM)) and/or nonvolatile media (such as read only memory (ROM), Flash memory, optical disks, magnetic disks, and so forth). Store 116 can include fixed media (e.g., RAM, ROM, a fixed hard drive, etc.) as well as removable media (e.g., a Flash memory drive, a removable hard drive, an optical disk, and so forth).

Various information can be maintained in local store 116. In one or more embodiments, a component or module of mobile communications device 102 (e.g., module 114 or 120) maintains an address book, also referred to as a contacts list. The address book includes various information regarding particular individuals and/or entities as desired by a user of device 102. The address book can include, for example, information regarding friends, family, business acquaintances, service providers, businesses, and so forth. A variety of different information can be maintained, such as phone numbers, e-mail addresses, instant messaging addresses, and so forth.

In one or more embodiments, communication module 120 obtains data regarding the individuals or other entities identified in the address book of local store 116 from social networking services 106 as discussed above. This data that is obtained is also stored in local store 116, as part of the address book or alternatively separate from the address book. Accordingly, communication module 120 can maintain current data from social networking services 106 in local store 116. When a change is made to the data on a social networking service 106, that change is obtained by communication module 120 and saved in local store 116. Accordingly, other components are modules of device 102 can access the data in local store 116 in order to obtain current data from social networking services 106.

Alternatively, rather than maintaining information from social networking services 106 in local store 116, such information can be obtained by communication module 120 when desired. For example, when information regarding a particular individual or entity is desired to be displayed on screen 112, that information can be obtained by communication module 120 from intermediary data service 108 or social networking services 106.

The information regarding individuals or other entities that is stored in local store 116 can include information obtained from social networking services 106 and can optionally include information obtained from other sources. For example, a user of mobile communications device 102 can input information regarding an individual or other entity that is maintained in local store 116. By way of another example, mobile communications device 102 can receive a contact card or electronic business card from another device and store information from that card in local store 116. Accordingly, when the information regarding an individual or other entity stored in local store 116 is subsequently accessed by another component or module of device 102, that information can be information obtained from social networking services 106 and/or other sources.

A variety of different information regarding an individual or other entity can be maintained in local store 116. In one or more embodiments, individuals and other entities can publish a variety of different information using social networking services 106, and such published information can be obtained and stored in local store 116. Examples of such published information include phone numbers (e.g., a mobile phone number, a home phone number, a work phone number, and so forth), e-mail addresses, instant messaging addresses, postal mailing addresses, images or videos, images or videos that both the user of device 102 and the individual or entity are tagged in, a social feed (e.g., indicating a current location of, or activity engaged in by, the individual or other entity), profile details (e.g., an individual's relationship status, birthday, interests or hobbies, and so forth), upcoming meetings or events that both the user of device 102 and individual or entity are to be part of, friends of the individual or entity, and so forth. Additional information that is not published using social networking services 106 can also be obtained from other sources as discussed above and stored in local store 116. Examples of such information include, recent messages that the individual or entity sent to and/or received from the user of device 102, phone numbers or addresses entered by the user of device 102 or obtained from electronic business cards, and so forth.

Input module 118 receives user inputs from a user of mobile communications device 102. These user inputs indicate particular user requests, such as commands, actions to be carried out, data being input, and so forth. The user input can be provided in a variety of different manners, such as by pressing one or more keys of a keypad or keyboard of device 102, by pressing a particular portion of a touchpad or touchscreen of device 102, by placing a finger of the user's hand on a surface of the touchscreen and dragging the finger across the surface, and so forth. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners, such as via other physical feedback input to the device (e.g., tapping any portion of device 102 or another action that can be recognized by a motion detection component of device 102, such as shaking device 102, rotating device 102, etc.), and so forth.

UI module 114 generates, manages, and/or outputs a user interface for display on screen 112. This user interface includes one or more panels that are displayed on screen 112. A panel refers to a collection of information that is displayed. Different panels can display different information and/or can display information that is organized in different manners. A user can navigate through different panels via various user inputs. A variety of different panels can be displayed for a variety of different purposes, such as to allow a user to place and/or answer a phone call, to allow a user to view information regarding another user that is part of the phone call, to allow a user to enter information regarding an individual or entity, and so forth. The particular information displayed by UI module 114 as a particular panel can vary, such as based on the inputs of the user (e.g., as obtained from user input module 118), information regarding a current phone call that the user is participating in (e.g., as obtained from communication module 120), information from local store 116, and so forth.

The particular panel displayed by UI module 114 is based at least in part on a phone call that mobile communications device 102 is engaged in at the time of display of the panel. This phone call is between mobile communications device 102 and another device 104. As devices 102 and 104 are typically being used by particular individuals during a phone call, the phone call can also be referred to as being between these individuals or between an individual and a device. When two devices are engaged in a phone call, a connection between the two devices exists over a network (which can include wired and/or wireless portions). Either device can typically end the phone call, in which case the connection between the two devices ceases.

It should also be noted that a particular individual using a device 104 during a phone call can be an individual associated with that device 104 or alternatively an agent or other representative of an entity associated with that device 104 as discussed above. For example, an entity can be a business or other group. This business or other group can have various information, such as phone numbers and addresses, published on social networking services 106 and obtained by communication module 120. However, when a user of mobile communications device 102 places a phone call to this entity, an individual representing the entity answers the call and engages in the phone call with the user of device 102.

In one or more embodiments, UI module 114 can display a call control panel and an in-call contact information panel. Generally, the call control panel displays various information regarding the phone call and optionally control requests for the phone call that can be input by the user of device 102. The in-call contact information panel, on the other hand, displays information regarding the individual (or entity that individual represents) with which mobile communications device 102 is currently engaged in the phone call and optionally indications of requests for additional communications with the individual (or entity that individual represents) that can be input by the user. The call control panel and in-call contact information panel can be displayed in situations where device 102 initiates a phone call and/or another device initiates the phone call.

During a phone call, UI module 114 can display one of the call control panel and the in-call contact information panel. Accordingly, if display of one of call control panel and the in-call contact information is requested while the other is displayed, the requested panel is displayed in place of the previously displayed panel. Alternatively, both the call control panel and the in-call contact information panel can be displayed concurrently.

A call control panel displays various call control information regarding a phone call that the mobile communications device is engaged in at the time the call control panel is displayed. This information can include status information regarding the phone and/or the phone call, as well as indications of various control requests that can be made by the user regarding the phone call. For example, the status information can include an identifier of the individual with which mobile communications device 102 is currently engaged in the phone call (or an identifier of an entity represented by the individual with which mobile communications device 102 is currently engaged in the phone call), an indication of whether that individual has been placed on hold, an indication of whether the microphone of device 102 has been muted, a duration of the phone call, an indication of the remaining battery life of device 102, an indication of signal strength for the phone call, and so forth. By way of another example, indications of control requests can include an indication to activate a speaker of device 102, an indication to mute a microphone of device 102, an indication to end the phone call, an indication to put the individual with which mobile communications device 102 is currently engaged in a phone call on hold, an indication to add another individual to the phone call (e.g., to initiate or expand a conference call), and so forth. These various control requests can be input by a user of device 102 using a variety of different user inputs as discussed above.

An in-call contact information panel displays various information regarding the individual (or entity that individual represents) with which mobile communications device 102 is currently engaged in the phone call. This contact information panel is displayed during the call, which is also referred to as displaying the contact information panel in-call. A variety of different information can be displayed on the in-call contact information panel, such as any information regarding the individual or entity that is available from local store 116 and/or that can be obtained by communication module 120 from social networking services 106. This information displayed in the in-call contact information panel can also include an indication of the source of the information (e.g., an identifier of a particular social networking service 106, an identifier of a user of device 102, etc.), as well as a date and/or time when the information was obtained by device 102. Additionally, if mobile communications device 102 is engaged in a phone call with multiple individuals (e.g., a multi-party conferencing call), then the in-call contact information panel displays information regarding those multiple individuals (or the entities that those multiple individuals represent).

Mobile communications device 102 can optionally be engaged in multiple different phone calls concurrently, such as when using call waiting, when placing a call on hold, and so forth. When engaged in multiple phone calls concurrently, a separate in-call contact information panel is displayed for each phone call. Only one such in-call contact information panel is displayed at a time, and the user can input requests to transition between the different in-call contact information panels. Alternatively, two or more such in-call contact information panels can be displayed concurrently. Each such in-call contact information panel displays various information regarding the individual (or entity that that individual represents) or individuals (or entities that the individuals represent) with which mobile communications device 102 is currently engaged in the phone calls.

The call control panel and in-call contact information panel can be displayed by mobile communications device 102 for the duration of the phone call. When the phone call ends, the display of the call control panel and the in-call contact information panel also ceases. Alternatively, the call control panel and/or in-call contact information panel can be displayed for an amount of time (e.g., five seconds, ten seconds, thirty seconds, etc.) after the call ends.

FIGS. 2-6 illustrate example panels that can be displayed by a mobile communications device in accordance with one or more embodiments. These panels can be displayed on, for example, screen 112 of FIG. 1.

Figure 2:
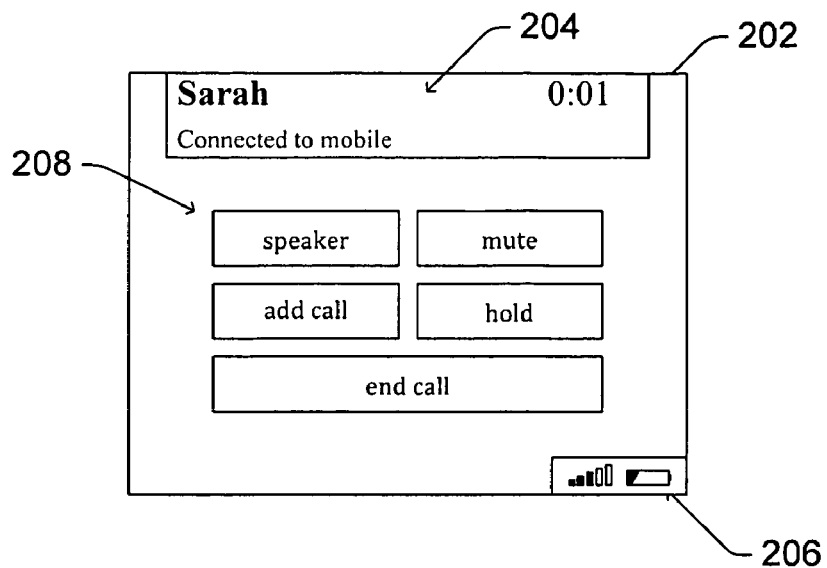
FIG. 2 illustrates an example call control panel in accordance with one or more embodiments.

FIG. 2 illustrates an example call control panel 202 displayed by a mobile communications device in accordance with one or more embodiments. Call control panel 202 includes status information in the form of call connection information 204 identifying an individual ("Sarah") with which the user of the mobile communications device is engaged in a phone call. Call connection information 204 also indicates a duration of the call in a "minutes:seconds" format ("0:01") or an "hours:minutes:seconds" (or "hours:minutes") format if the call is an hour or longer, and an indication of the status of the phone call ("connected to mobile", indicating that "Sarah" is using her mobile phone or other mobile communications device).

Call control panel 202 also includes status information in the form of phone status information 206. Phone status information 206 indicates a current signal strength of the device displaying control panel 202 (in the form of multiple vertical bars), and a current battery life of the device displaying control panel 202 (in the form of a symbol of a battery).

Call control panel 202 also includes indications 208 of control requests that can be input by the user of the mobile communications device. These control requests include an indication to turn on a speaker (e.g., enable speakerphone functionality), place the phone call on mute, add another caller, placed a phone call on hold, and end the call. A user request to perform one of these control requests can be input by the user in a variety of different manners as discussed above.

Figure 3:
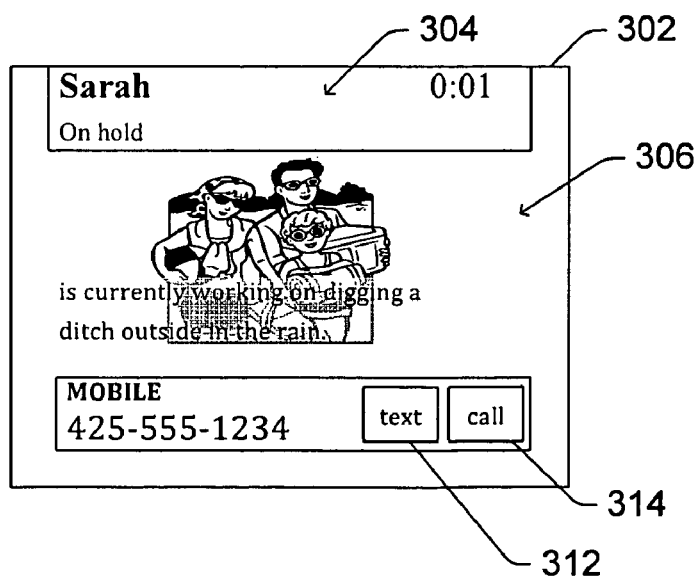
FIG. 3 illustrates an example in-call contact information panel in accordance with one or more embodiments.

FIG. 3 illustrates an example in-call contact information panel 302 in accordance with one or more embodiments. In-call contact information panel 302 includes status information 304 and contact information 306. In the illustrated example, status information 304 is the same as status information 204 of FIG. 2. Alternatively, status information 304 can include a subset of the information in status information 204, and/or can include other status information not included in status information 204. The panel 302 illustrated in FIG. 3 can be the entire in-call contact information panel, or alternatively a portion of the panel, as discussed in more detail below.

Contact information 306 is in-call contact information for the phone call that the mobile communications device is currently engaged in. In the illustrated example, this in-call contact information includes a current status or location of the other individual engaged in the phone call (e.g., that Sarah is currently working on digging a ditch outside in the rain). Optionally, an indication of the date and/or time that this current status or location was obtained, as well as the social networking service from which this current status or location was obtained, can be displayed as part of contact information 306. Additionally, a phone number of the individual with which the mobile communications device is engaged in the phone call is also displayed as part of contact information 306. In the illustrated example, an indication of the type of phone number (e.g., mobile) is also displayed as part of contact information 306. An image recently uploaded to a social networking service by the other individual engaged in the phone call can also be displayed. The image can be displayed as a separate portion of contact information 306, or alternatively can serve as a background image as illustrated in FIG. 3.

In one or more embodiments, the user can also input requests for additional communications with the individual via in-call contact information panel 302. The types of these additional communications can vary based on the type of information displayed. For example, a request to send a message to or initiate a phone call with an individual via a particular phone number can be input if the type of information displayed is a phone number. By way of another example, a request to send a message to an individual via a particular address (e.g., e-mail address, instant messaging address, etc.) can be input if the type of information displayed is an address.

A user can input such a request while in-call contact information panel 302 is displayed in a variety of different manners as discussed above. In response to such an input, the requested action is taken. For example, the device displaying panel 302 can initiate a phone call to a particular phone number, can open a data input screen to allow data to be input that is subsequently sent as a message to the particular phone number or address, and so forth.

In the example of FIG. 3, a text option 312 and a call option 314 are associated with the mobile phone number displayed. Accordingly, a user can input a request to send a text message to the displayed mobile phone number by selecting text option 312 or otherwise inputting a send text message request. Similarly, a user can input a request to initiate a phone call to the displayed mobile phone number by selecting call option 314 or otherwise inputting an initiate call request. It is to be appreciated that, in certain situations certain options need not be made available to the user. For example, if the current phone call was initiated to or from the displayed mobile phone number, then call option 314 need not be displayed (or can be disabled if displayed).

In one or more embodiments, the mobile communications device displays only one of panels 202 of FIG. 2 and 302 of FIG. 3 at a time. The device can transition between displaying panel 202 and panel 302 in response to a user request. Such a user request can be input in a variety of different manners as discussed above.

For example, a pan gesture can be used to indicate a request to transition between in-call contact information panel 302 and call control panel 202. The screen on which panels 302 and 202 are displayed includes touchscreen functionality that can be leveraged to detect a gesture input via a user's finger or other input device (such as a stylus). The pan gesture may involve placing a finger of the user's hand on a surface of the touchscreen and dragging the finger across the surface. An indication of the correct direction that the user is to drag in order to transition to panel 302 from panel 202 (or to transition from panel 202 to panel 302) can be displayed on panel 302 (or panel 202). The user input module 118 of FIG. 1 can detect this gesture and indicate to UI module 114 of FIG. 1 to change to displaying the new panel.

The indication of the correct direction that the user is to drag to transition to panel 302 or to panel 202 can be displayed in a variety of different manners, such as a small portion (e.g., a sliver) of the display indicating what is available in another panel, an icon indicating what is available in another panel, and so forth. For example, a sliver of the display on the right side of call control panel 202 can indicate that the user can input a pan gesture to the right to transition to the in-call contact information panel 302. By way of another example, a sliver of the display on the left side of in-call contact information panel 302 can indicate that the user can input a pan gesture to the left to transition to call control panel 202.

Alternatively, other techniques can be used for the user to indicate that the device is to transition between in-call contact information panel 302 and call control panel 202. For example, when displaying panel 202, an indication of the availability of in-call contact information panel 302 can be displayed, and the user can touch this indication with his or her finger, a stylus, or otherwise input a request to display panel 302. In response to such a request, panel 302 is displayed. Similarly, when displaying panel 302, an indication of the availability of call control panel 202 can be displayed, and the user can touch this indication with his or her finger, a stylus, or otherwise input a request to display panel 202. In response to such a request, panel 202 is displayed.

A request to transition from call control panel 202 to in-call contact information panel 302 can be input in a variety of different manners as discussed above. In one or more embodiments, this request is a single user input. A single user input refers to a single action by the user. This single action can be a single gesture (e.g., a pan gesture as discussed above) or sequence of gestures, pressing of a single key or key sequence, pressing of a single part of a touchscreen or sequence of parts of a touchscreen, and so forth. In response to this single user input, a transition from call control panel 202 to in-call information panel 302 is made. The user need not navigate through multiple different menu options, screen displays, and so forth, inputting a different request at each stage of the navigation. Rather, the in-call contact information panel 302 is available to the user from the call control panel 202 with a single gesture or other input.

Additionally, depending on the size of the screen of the mobile communications device, the mobile communications device can have additional information available for display but insufficient screen space to display the additional information. Accordingly, the user can input requests to scroll up and/or down through in-call contact information panel 302 to allow this additional information to be displayed. A request to scroll up and/or a request to scroll down can be input in a variety of different manners as discussed above, such as using a pan gesture, pressing a physical key, pressing a portion of a touchscreen, and so forth. Multiple additional portions can be scrolled up and/or down through. For example, assume that additional information for the individual with which the mobile communications device is engaged in a phone call is available. The user can input a request to, for example, scroll down from the displayed portion of in-call contact information panel 302 in FIG. 3, resulting in a different portion of panel 302 being displayed.

Figure 4:
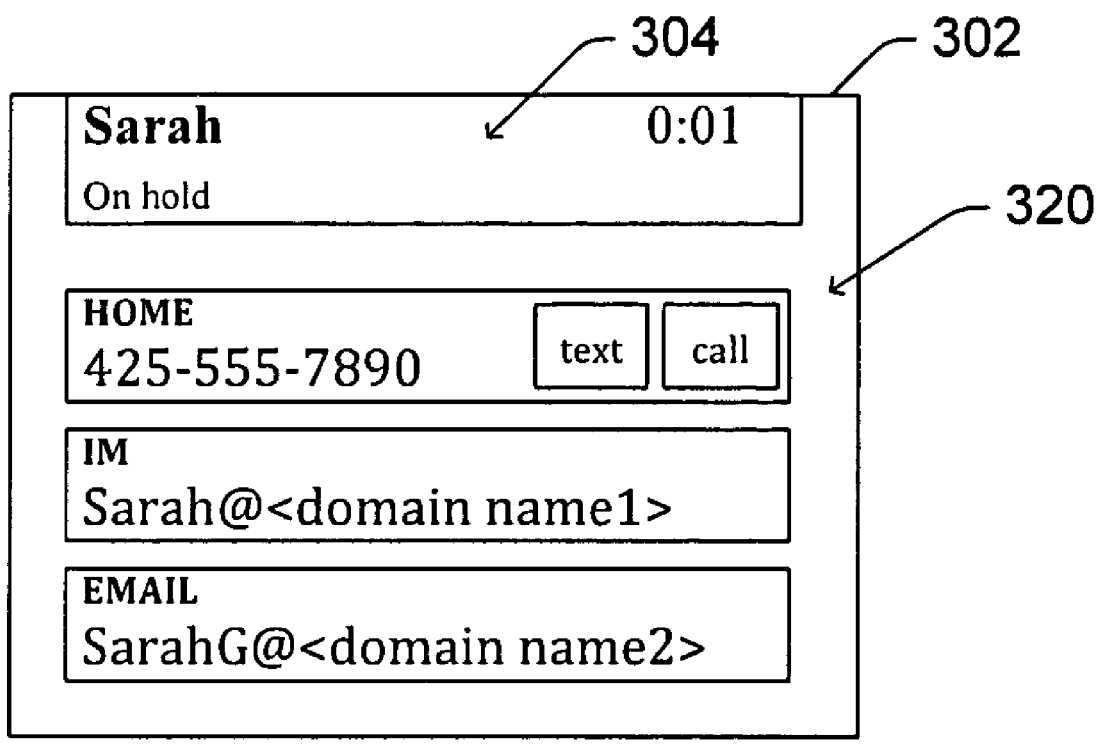
FIG. 4 illustrates another example in-call contact information panel in accordance with one or more embodiments.

FIG. 4 illustrates an example portion of in-call contact information panel 302 in accordance with one or more embodiments. The portion of panel 302 illustrated in FIG. 4 is the portion displayed after the user requests to scroll down from the display in FIG. 3. In-call contact information panel 302 includes status information 304 and contact information 320. Status information 304 is the same status information as discussed above with reference to FIG. 3.

Contact information 320 is additional in-call contact information for the phone call that the mobile communications device is currently engaged in. In the illustrated example, this in-call contact information includes an indication of a home phone number for the individual, as well as an instant messaging (IM) address for the individual and an e-mail address for the individual. Although, a message or text option (analogous to options 312 and 314) are not illustrated for the addresses in contact information 320, such a message or text option can still be available to the user. For example, the user could touch the area of the screen that displays the e-mail address in order to have a data input screen opened to allow data to be input that is subsequently sent as a message to the address.

Figure 5:
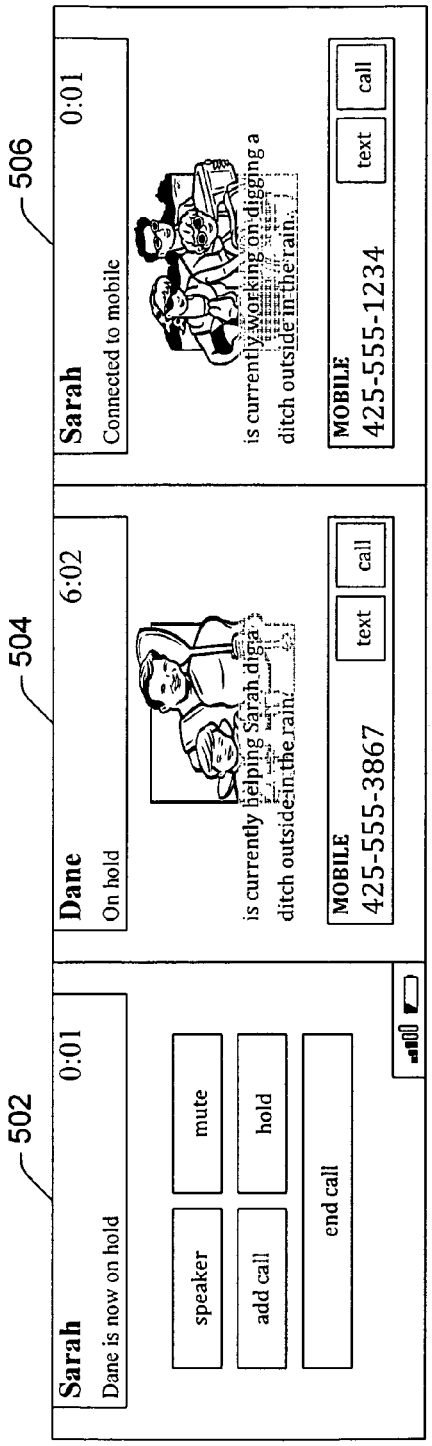
FIG. 5 illustrates additional example panels in accordance with one or more embodiments.

FIG. 5 illustrates additional example panels in accordance with one or more embodiments. A call control panel 502 and two in-call contact information panels 504 and 506 are illustrated. Although three panels are illustrated in FIG. 5, in one or more embodiments only one of the three panels is displayed at any given time. The user can transition between these three panels 502, 504, and 506, using a pan gesture or other user inputs as discussed above.

FIG. 5 illustrates the situation where the user of the device displaying panels 502-506 is engaged in two phone calls concurrently. A user can be engaged in two phone calls concurrently in a variety of situations, such as a conference call, using call waiting or otherwise putting one individual on hold, and so forth. A separate in-call contact panel 504 and 506 is displayed for each phone call. For the phone calls illustrated in FIG. 5, the phone call to the individual "Dane" is currently on hold while the phone call to the individual "Sarah" is currently active. This status of the phone calls is illustrated in panels 502-506.

Figure 6:
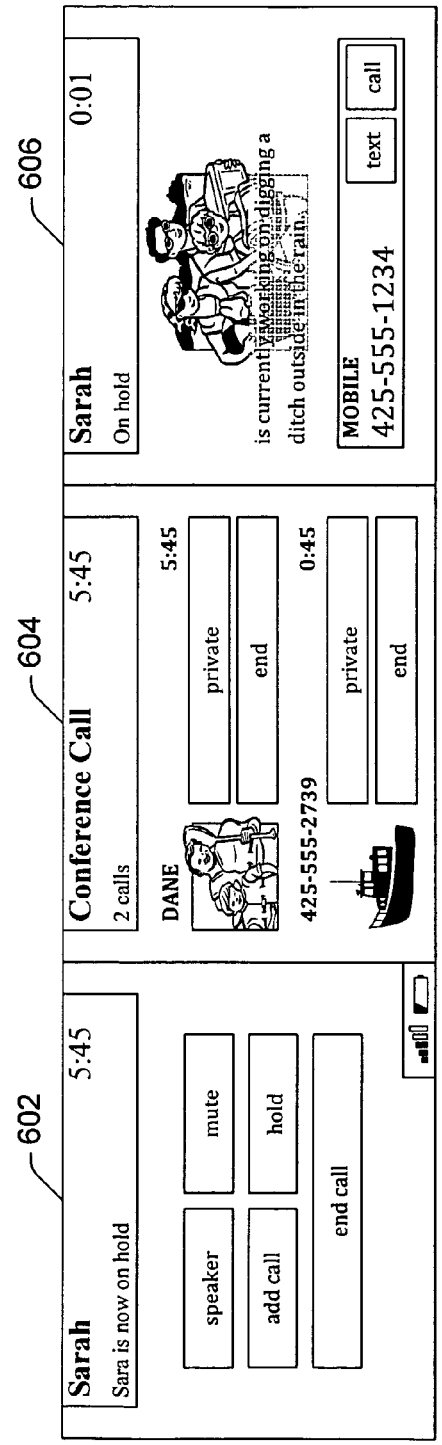
FIG. 6 illustrates additional example panels in accordance with one or more embodiments.

FIG. 6 illustrates additional example panels in accordance with one or more embodiments. A call control panel 602 and two in-call contact information panels 604 and 606 are illustrated. Although three panels are illustrated in FIG. 6, in one or more embodiments only one of the three panels is displayed at any given time. The user can transition between these three panels 602, 604, and 606, using a pan gesture or other user inputs as discussed above.

FIG. 6 illustrates the situation where the user of the device displaying panels 602-606 is engaged in two phone calls concurrently, one of which is a conference call. A separate in-call contact panel 604 and 606 is displayed for each phone call. For the phone calls illustrated in FIG. 6, the phone call to the individual "Sarah" is on hold while the conference call is currently active. This status of the phone calls is illustrated in panels 602-606.

In the illustrated example, in-call contact panel 604 includes information regarding the multiple other individuals that are part of the conference call. As multiple individuals are included in the conference call, the information regarding each individual that is included in panel 604 can be reduced in order to conserve space. For example, a name of the individual, an image recently uploaded to a social networking service by the individual, and a duration that that individual has been on the phone call to the device displaying panel 604 can be displayed. Indications can also be displayed that the user can end the individual's participation in the conference call, such as by disconnecting the individual (e.g., "end"), or returning the individual to a one-on-one call (e.g., "private").

Figure 7:
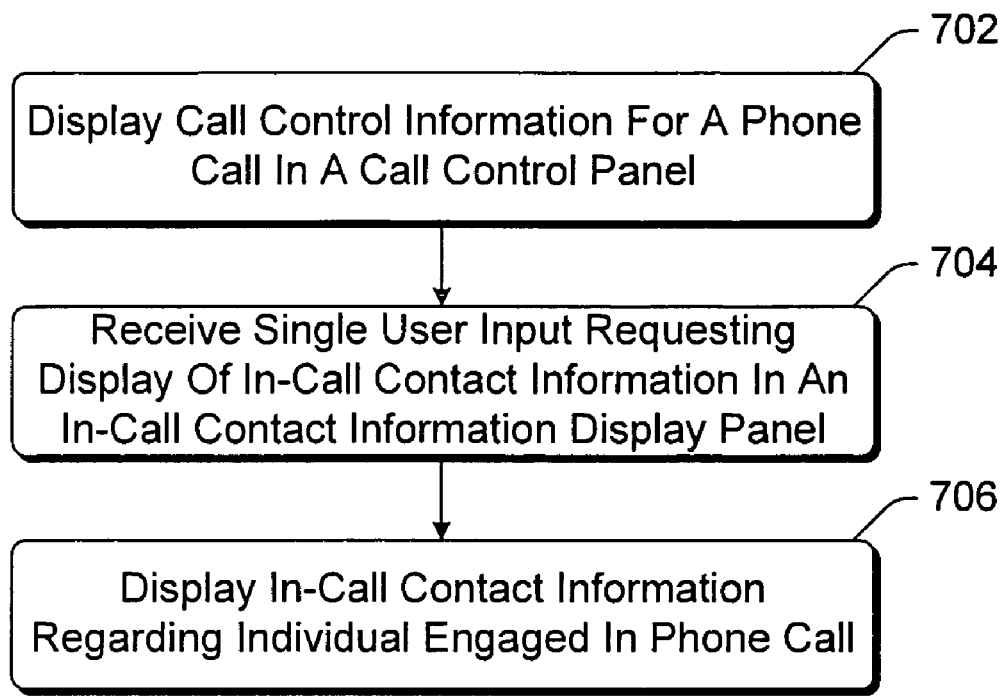
FIG. 7 is a flowchart illustrating an example process for a device implementing the in-call contact information display in accordance with one or more embodiments.

FIG. 7 is a flowchart illustrating an example process 700 for a device implementing the in-call contact information display in accordance with one or more embodiments. Process 700 is carried out by a mobile communications device, such as device 102 of FIG. 1, and can be implemented in software, firmware, hardware, or combinations thereof. Process 700 is an example process for implementing the in-call contact information display; additional discussions of implementing the in-call contact information display are included herein with reference to different figures.

In process 700, call control information for a phone call is displayed in a call control panel (act 702). A variety of different information including status information regarding the phone and/or phone call as well as indications of various control requests that can be made by the user regarding the phone call can be displayed as discussed above.

A single user input requesting display of in-call contact information in an in-call contact information display panel is received (act 704). This in-call contact information display panel includes various information regarding the individual with which the device implementing process 700 is currently engaged in a phone call as discussed above.

In response to the request in act 704, the in-call contact information regarding the individual engaged in the phone call is displayed (act 706). This in-call contact information can be displayed in an in-call contact information display panel as discussed above, or alternatively can be displayed in different manners.

Figure 8:
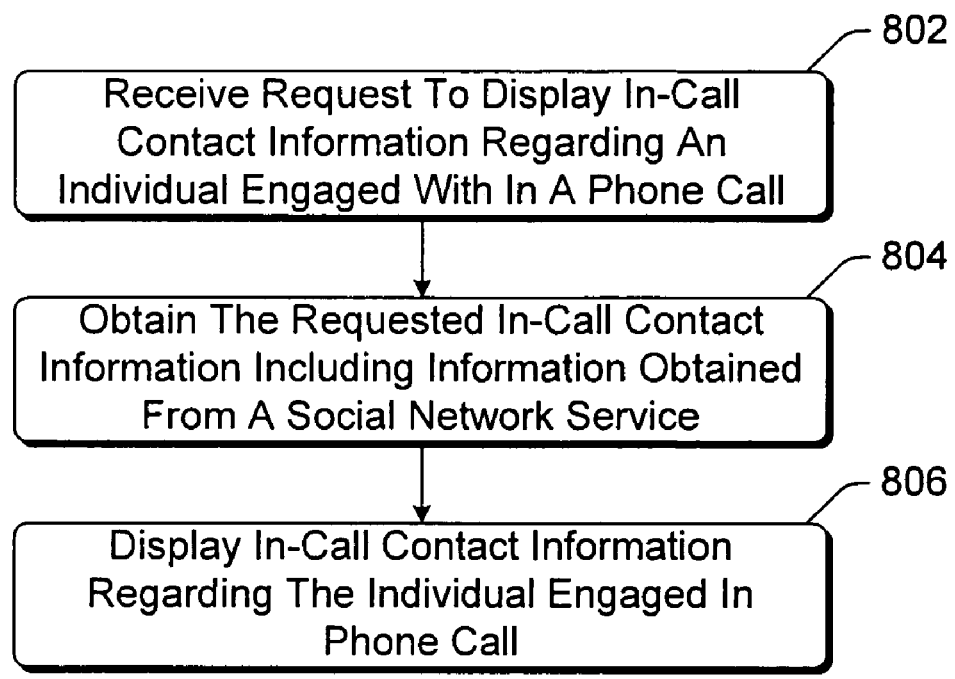
FIG. 8 is a flowchart illustrating an example process for a device implementing the in-call contact information display in accordance with one or more embodiments.

FIG. 8 is a flowchart illustrating an example process 800 for a device implementing the in-call contact information display in accordance with one or more embodiments. Process 800 is carried out by a mobile communications device, such as device 102 of FIG. 1, and can be implemented in software, firmware, hardware, or combinations thereof. Process 800 is an example process for implementing the in-call contact information display; additional discussions of implementing the in-call contact information display are included herein with reference to different figures.

In process 800, a request to display in-call contact information regarding an individual engaged with in a phone call is received (act 802). This individual is the individual with which the device implementing process 800 is engaged in the phone call.

In response to the request, the in-call contact information is obtained (act 804). This in-call contact information includes information obtained from a social networking service as discussed above. This information can be obtained from the social networking service in response to the request in act 802, or alternatively can be obtained from the social networking service at other times and maintained in a local store of the device implementing process 800 as discussed above.

The obtained in-call contact information regarding the individual engaged in the phone call is displayed (act 806). This information is displayed in an in-call contact information display panel, as discussed above.

Figure 9:
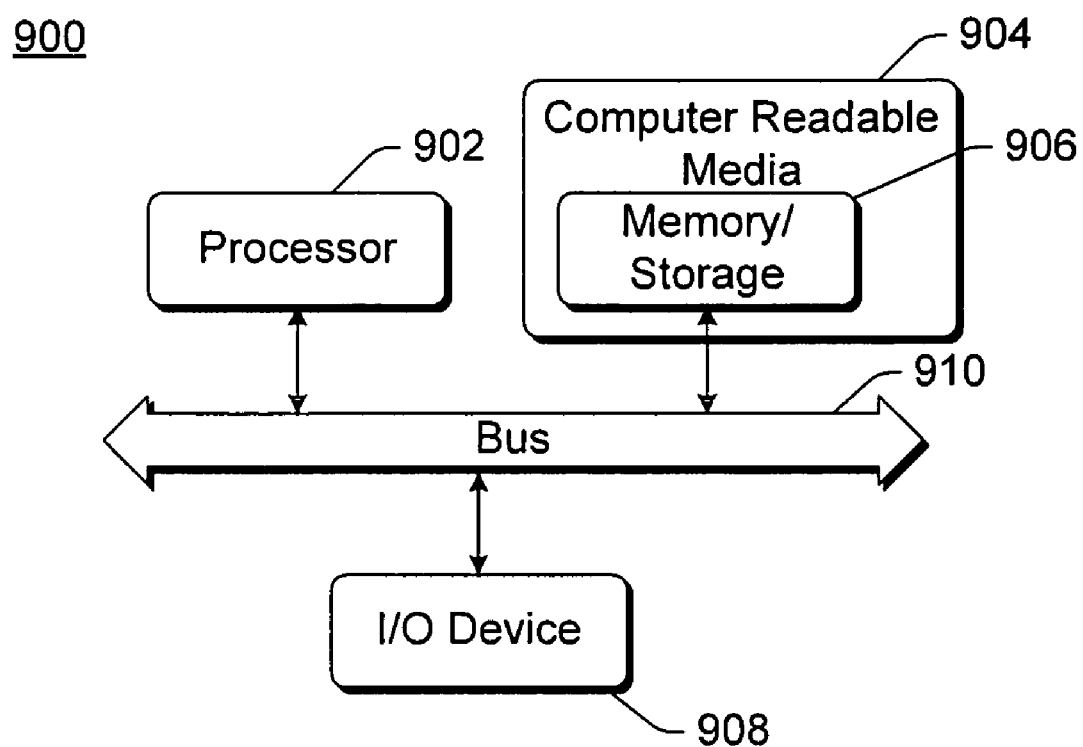
FIG. 9 illustrates an example computing device that can be configured to implement the in-call contact information display in accordance with one or more embodiments.

FIG. 9 illustrates an example computing device 900 that can be configured to implement the in-call contact information display in accordance with one or more embodiments. Computing device 900 can be, for example, a mobile communications device 102 of FIG. 1.

Computing device 900 includes one or more processors or processing units 902, one or more computer readable media 904 which can include one or more memory and/or storage components 906, one or more input/output (I/O) devices 908, and a bus 910 that allows the various components and devices to communicate with one another. Computer readable media 904 and/or one or more I/O devices 908 can be included as part of, or alternatively may be coupled to, computing device 900. Bus 910 represents one or more of several types of bus structures, including a memory bus or memory controller, a peripheral bus, an accelerated graphics port, a processor or local bus, and so forth using a variety of different bus architectures. Bus 910 can include wired and/or wireless buses.

Memory/storage component 906 represents one or more computer storage media. Component 906 can include volatile media (such as random access memory (RAM)) and/or nonvolatile media (such as read only memory (ROM), Flash memory, optical disks, magnetic disks, and so forth). Component 906 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 902. It is to be appreciated that different instructions can be stored in different components of computing device 900, such as in a processing unit 902, in various cache memories of a processing unit 902, in other cache memories of device 900 (not shown), on other computer readable media, and so forth. Additionally, it is to be appreciated that the location where instructions are stored in computing device 900 can change over time.

One or more input/output devices 908 allow a user to enter commands and information to computing device 900, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 9. The features of the in-call contact information display techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions that, when executed by one or more processors of a mobile communications device, cause the one or more processors to:
    display, on a screen, call control information regarding a first phone call that a user of the mobile communications device is currently engaged in with a first individual;
    receive a single user input requesting display of in-call contact information for the first individual;
    display, in response to the single user input, the in-call contact information for the first individual including data regarding the first individual obtained by the mobile communications device from a social networking service;
    receive an additional single user input requesting display of in-call contact information for a second individual with which the user is currently engaged in a second phone call, the user being engaged in multiple phone calls concurrently; and
    display, in response to the additional single user input, the in-call contact information for the second individual including data regarding the second individual obtained by the mobile communications device from the social networking service.

2. One or more computer storage media as recited in claim 1, wherein to display the in-call contact information for the first individual is to display the in-call contact information for the first individual in place of the call control information on the screen.

3. One or more computer storage media as recited in claim 1, wherein the data regarding the first individual obtained from the social networking service includes one or more phone numbers for the first individual and one or more addresses for the first individual.

4. One or more computer storage media as recited in claim 1, wherein the data regarding the first individual obtained from the social networking service includes one or more images published by the first individual via the social networking service.

5. One or more computer storage media as recited in claim 1, wherein to display the in-call contact information for the first individual is further to display an indication of the social networking service from which the data regarding the first individual is obtained.

6. One or more computer storage media as recited in claim 1, wherein the multiple instructions further cause the one or more processors to display, concurrently with the in-call contact information for the first individual, at least some of the call control information.

7. One or more computer storage media as recited in claim 1, wherein the multiple instructions further cause the one or more processors to receive a user selection of an option displayed as part of the in-call contact information for the first individual, the option being an option to send a message to an address of the first individual.

8. One or more computer storage media as recited in claim 1, wherein the multiple instructions further cause the one or more processors to cease display of the in-call contact information for the first individual when the first phone call ends.

9. A method implemented in a mobile communications device, the method comprising:
    receiving a request to display in-call contact information regarding an individual that is currently engaged in a phone call with the mobile communications device;
    obtaining, in response to the request, the in-call contact information, the in-call contact information including information obtained by the mobile communications device from a social networking service;

displaying the in-call contact information;

receiving an additional request to display additional in-call contact information regarding an additional individual that is currently engaged in an additional phone call with the mobile communications device, the mobile communications device being engaged in multiple phone calls concurrently;

obtaining, in response to the additional request, the additional in-call contact information, the additional in-call contact information including additional information obtained by the mobile communications device from the social networking service; and displaying the additional in-call contact information.

10. A method as recited in claim 9, wherein the individual represents an entity that publishes information regarding the entity via the social networking service, and wherein the in-call contact information regarding the individual comprises in-call contact information regarding the entity.

11. A method as recited in claim 9, wherein the information obtained from the social networking service includes one or more phone numbers for the individual and one or more addresses for the individual.

12. A method as recited in claim 11, wherein the information obtained from the social networking service further includes one or more images recently uploaded to the social networking service by the individual.

13. A method as recited in claim 9, wherein the information obtained from the social networking service includes one or more images uploaded by the individual to the social networking service.

14. A method as recited in claim 9, wherein the information obtained by the mobile communications device from the social networking service comprises information obtained by the mobile communications device via communications with an intermediary data service that in turn communicates with multiple different social networking services.

15. A method as recited in claim 9, further comprising ceasing displaying the in-call contact information when the phone call ends.

16. One or more computer storage media having stored thereon multiple instructions that, when executed by one or more processors of a mobile communications device, cause the one or more processors to:

display, on a screen, call control information regarding a phone call that a user of the mobile communications device is currently engaged in with a particular individual;

receive a single user input requesting display of in-call contact information for the particular individual;

display, in response to the single user input, the in-call contact information for the particular individual including information regarding the particular individual as well as at least some of the call control information, the information regarding the particular individual having been obtained by the mobile communications device from a social networking service and including one or more phone numbers and one or more addresses of the particular individual;

receive an additional single user input requesting display of in-call contact information for an additional individual with which the user is currently engaged in an additional phone call, the user being engaged in multiple phone calls concurrently; and display, in response to the additional single user input, the in-call contact information for the additional individual including information regarding the additional individual obtained by the mobile communications device from the social networking service.

\* \* \* \* \*